Sheet 1, 5 Sheets.

R. Hampson.

Printing Calico.

No. 2,116. Patented Jun. 7, 1841.

R. Hampson.
Printing Calico.
No. 2,116. Patented Jun. 7, 1841.
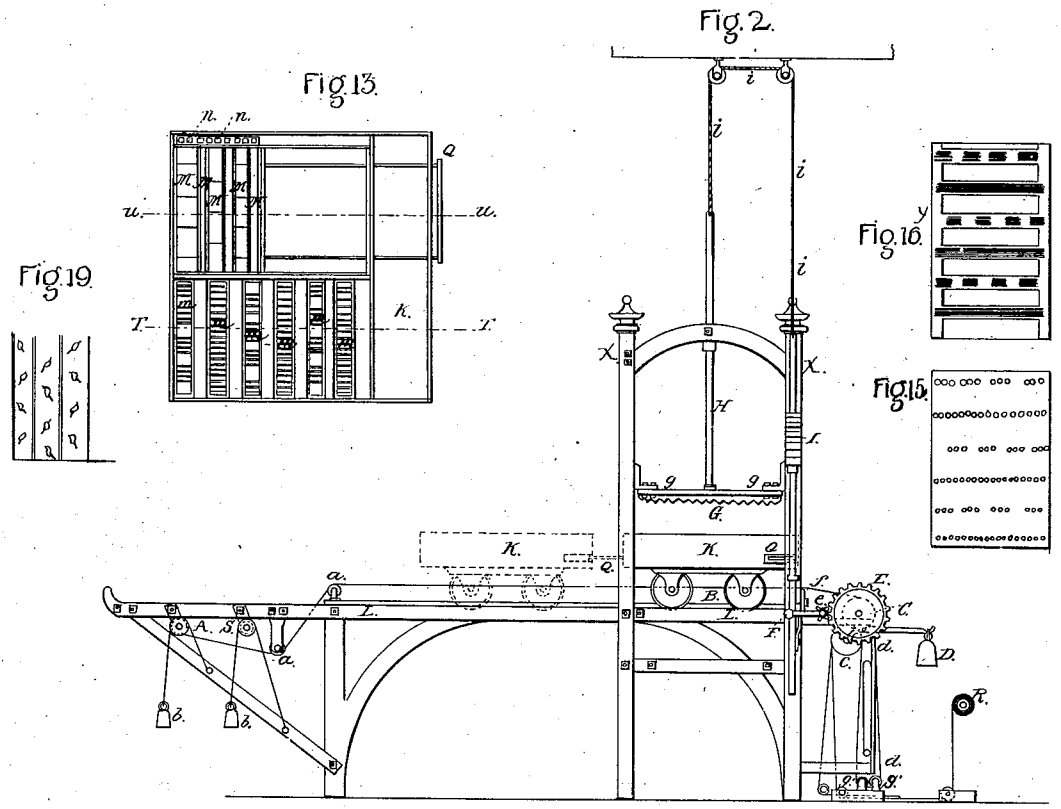

R. Hampson.
Printing Calico.
No. 2,116. Patented Jun. 7, 1841.
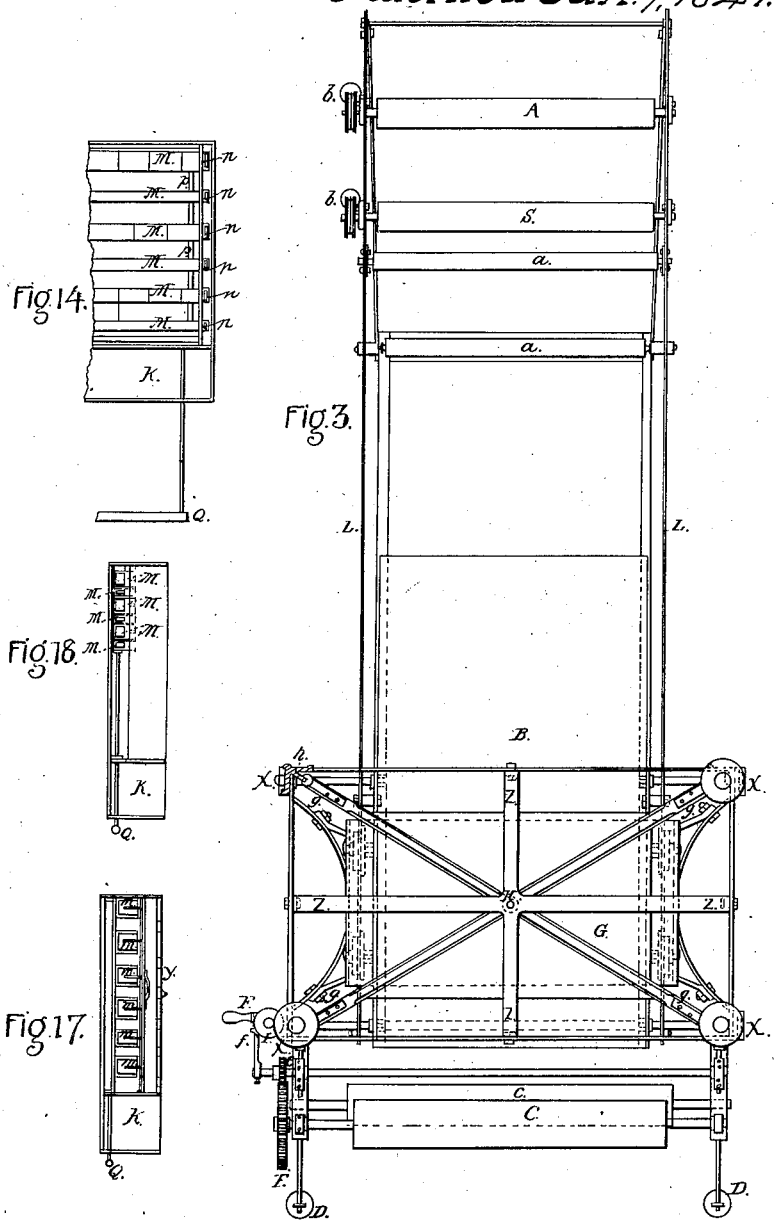

Sheet 4, 5 Sheets

R. Hampson.

Printing Calico.

No. 2,116. Patented Jun. 7, 1841.

Sheet 5, 5 Sheets.
R. Hampson.
Printing Calico.
No. 2,116. Patented Jun. 7, 1841.
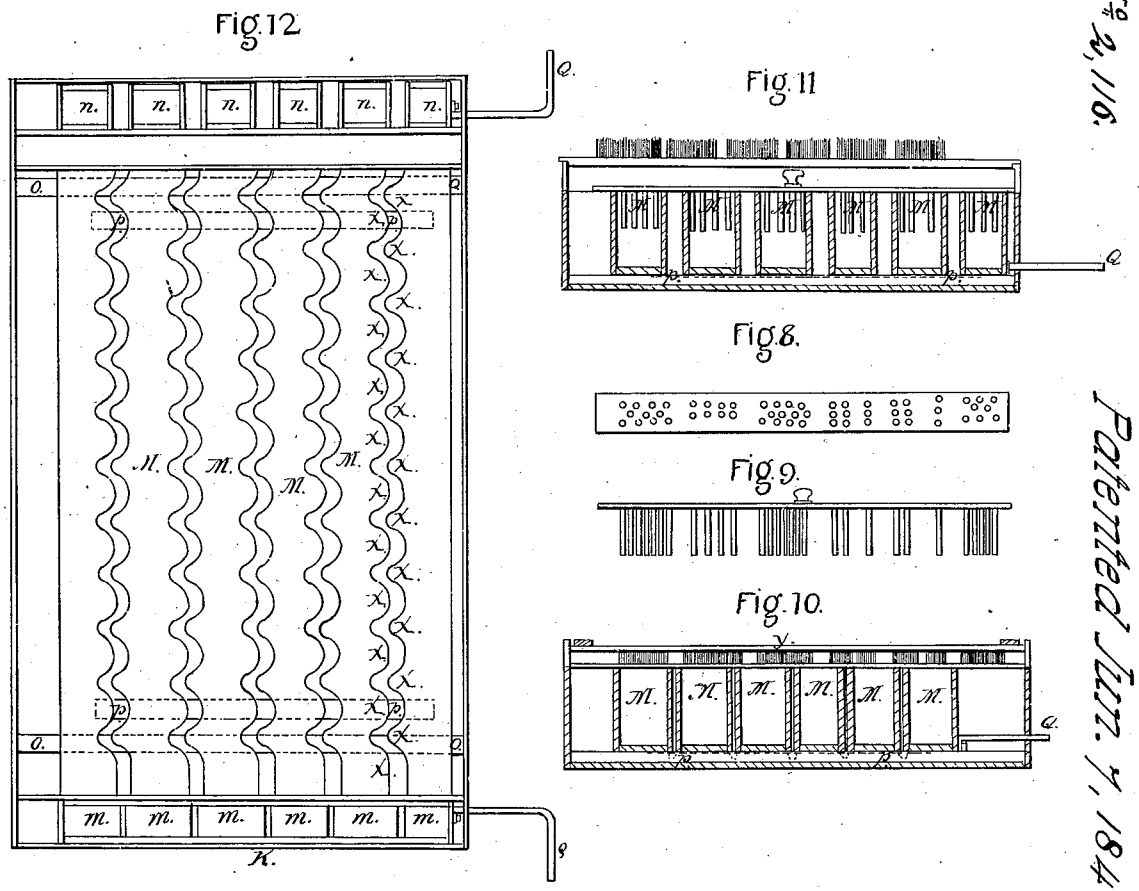

UNITED STATES PATENT OFFICE.

ROBERT HAMPSON, OF MANCHESTER, ENGLAND.

METHOD OF BLOCK PRINTING ON WOVEN FABRICS OF COTTON, LINEN, SILK, WOOLEN, &c.

Specification of Letters Patent No. 2,116, dated June 7, 1841; Antedated June 9, 1840.

*To all whom it may concern:*

Be it known that I, ROBERT HAMPSON, of Manchester, England, have invented a certain new and improved Method of Block-Printing on woven fabrics of cotton, linen, silk, and woolen, or any two or more of them intermixed, with improved machinery, apparatus, and implements for that purpose; and I do hereby declare that the description of my invention set forth and described in the following specification and accompanying drawing, to which I have herein referred, is a true and exact description.

The scale to which the annexed drawings are made is marked thereon and the same letter of reference which is used in one figure or view is used to indicate the same part in the remaining views or figures there represented.

Figure 1:
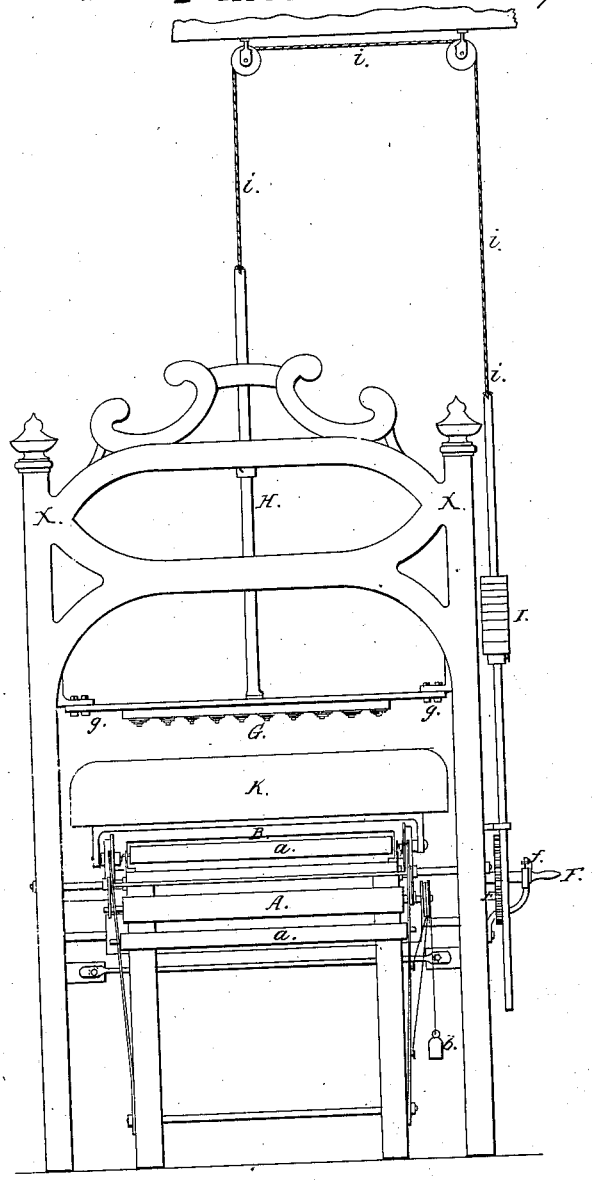

Figure 1 in the annexed drawings is an end elevation, Fig. 2 a side elevation, and Fig. 3 a plan of a machine for block printing.

In these figures A represents a roller or wooden cylinder on which the woven fabric to be printed is wound and S a similar roller provided with a length of calico or other cloth to pass under the fabric and protect the blanket during the printing process.

*a a* represent carrier rollers under the one and over the other of which the fabric and under cloth are carried in their passage toward the printing table B over which they pass as indicated by the pink and blue lines at Fig. 2 the pink line representing the fabric to be printed and the blue line the cloth to protect the blanket.

The rollers A and S are both prevented from revolving freely by means of a break or check line and the counter weights *b*, *b*, so that the fabric and under cloth are held in a state of moderate tension as they are drawn forward over the printing table B. The position at which the impression is given to the fabric is immediately over the letter B at Fig. 2 whence the fabric passes forward over the roller C and there separates from the calico or under cloth which passes between the roller C and the pressing roller *c* which is held in close contact with the under surface of the roller C by means of the small levers and counter weights D D. On the axis of the roller C is placed the spur wheel E which receives motion from the pinion *e* when made to revolve by means of the handle or winch F. This handle or winch is arranged to make one revolution for every intended progressive movement of the fabric having reference to the depth of the pattern or portion of the pattern intended to be impressed thereon and is held stationary during the printing operation by a small spring catch *f* as best seen at Fig. 1. The amount of revolution imparted to the wheel E necessarily depends on the relative size of the pinion *e* which can be changed when required so that as soon as one impression has been received on the woven fabric at the point B a uniform amount in length of the fabric corresponding with the amount printed is drawn forward by the revolution of the cylinder C and a fresh portion of the fabric presented to the printing operation at B. After the fabric has received the impression from the block and passed forward under the roller C it is carried over a heated plate *d d* for the purpose of drying it and thence forward under the carrier rollers *g′ g′* then over the pressing roller *c* and then under or over such carrier rollers as may be convenient until it is deposited printed and in a dry state on the roller R as best seen at Fig. 2.

The heated surface *d d* for the purpose of drying the printed fabric is produced by a constant flow of hot water or steam within a chamber of which *d d* forms one side but the mode of heating may be varied according to the nature of the fabric to be printed.

The block G from which the impression is received on the fabric is represented at Figs. 1 and 2 suspended immediately over and parallel to the table B where it is attached to the cross frame *g*, *g*, *g*, *g*, as seen in Fig. 3. This frame *g*, *g*, *g*, *g* is guided and kept horizontal in its ascent and descent within the strong upright frame of the machine *x x x x* by means of the center rod H working freely upward and downward in a hole in the center of the arms Z Z Z Z to which the top of the upright frame is braced together and strengthened and the straight edges *h* at each corner of the framing *g*, *g*, *g*, *g*, as seen at Fig. 3 in which at left hand corner the iron work at the top of the upright frame is removed to show the straight edge more clearly the cross frame *g*, *g*, *g*, *g*, is suspended in the position seen at Figs. 1 and 2 by means of the band *i i i i* and counter weight I so that by raising the counter weight I the cross frame and block descend by their own gravity and the block imparts the pattern to the fabric on the table B below returning to the position represented at Figs. 1 and 2 as soon as the weight I is drawn down by the operator.

Figures 4, 5:
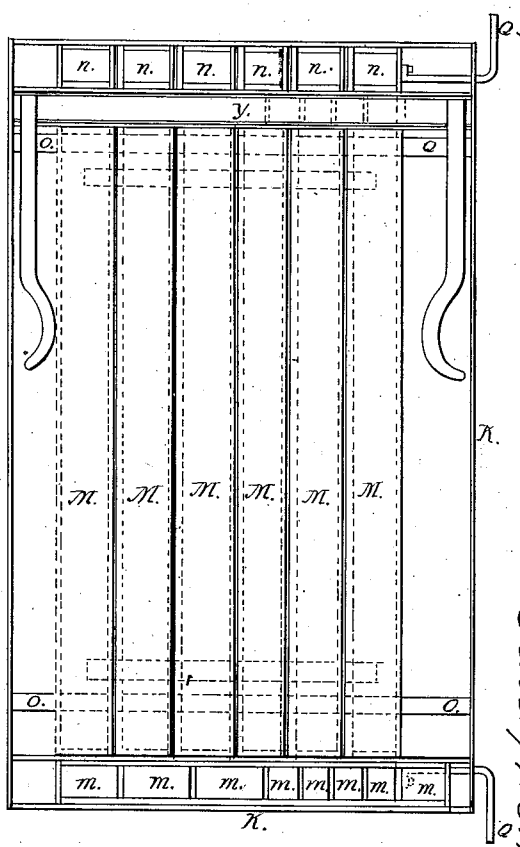

The apparatus for distributing the color to the block G is represented at K, Figs. 1 and 2 and moves on the railway L L as best seen at Fig. 2 where it is shown immediately under the block G preparatory to the block being depressed to receive the color and in dotted lines in the position to which it would be removed before the block again descended to impart the pattern to the fabric below. The construction of this part of my invention will be best seen in Sheet 2 where Figs. 4 and 5 represent plans and Figs. 6 and 7 transverse sections of a coloring apparatus for distributing six colors to the block at one operation. In these figures *m m m m m m m m* represent eight compartments or small cisterns in which the liquid colors are contained ready for distribution on the surface of their respective sieves or elastic surfaces M M M M M M Figs. 4 and 5 the red color and the adjoining blue being divided into two tints so as to produce what is termed by calico printers the rainbow effect as represented in the drawing. The six parallel boxes or cisterns under the sieves M M M M M M are supplied at their respective openings *n n n n n n* with the requisite amound of liquid to keep them elastic and are supported on two straight edges *o o* and *o o*. The first sieve box represented in Figs. 4 and 5 as containing the dark color is fixed or stationary but the other five can be separated by means of the bent irons Q Q which are attached to the last or yellow sieve and the amount of separation or accurate distance from each other at which they are held is determined by means of a strap of leather attached to the under side of all the sieves boxes or cisterns. The position of this leather is shown at *p p* in Figs. 6 and 7 and in dotted lines at Figs. 4 and 5.

Fig. 8 is a plan and Fig. 9 an elevation of a feeder or implement for distributing the color from the color cisterns *m m m m m m m m* to the sieves M M M M M M. This feeder consists of a series of wooden pegs fixed in and proceding from the under surface of a slab of wood and so placed as to correspond with the respective color cisterns so that by lifting the feeder out of the color cisterns and placing it on the sieves when in the position represented at Fig. 4 a regular amount of color is carried to each and the dipper being returned to the color vessels remains ready for the next operation.

Fig. 10 represents a teering brush or rubber *y* with two handles which is to be placed in a trough made for its reception when not in use as seen at Fig. 5 and is shown in elevation as when in use at Fig. 6. This brush or rubber is for teering or spreading the color uniformly on the surface of the respective sieves and is divided into spaces to correspond with the sieves when separated as in Fig. 4. The colors having been distributed by means of the dipper Fig. 9 and spread or teered by the brush *y*, Fig. 10, the coloring apparatus is passed along the railway L L under the block G where the projections Q Q coming in contact with the upright framing of the machine the several sieves M M M M M M are pushed together or closed as seen at Fig. 5 and are then in a position to correspond with the several portions of the pattern on the block G which are to receive the several colors. In the coloring apparatus described at Figs. 4 and 5 the color being distributed in straight lines the pattern on the block G must necessarily partake of the same character but by variations in the form of the sieves patterns of a different character may be produced.

Fig. 12 is a plan of another modification of the coloring apparatus in which by the sieves being made with projections or indentations fitting into each other marked *x* on the pink and yellow sieves alternate colors would be imparted to the block when the sieves were closed and the block brought into contact therewith; whereas in the former construction shown in Figs. 4 and 5 there would be the same color throughout. But this and other modifications of the coloring apparatus according to the nature of the pattern to be produced will be obvious to any party conversant with printing operations a principal advantage in the method described of distributing and teering the color depending on the movable arrangement of the sieves which allow of the near approximation of different colors in the pattern without endangering their admixture during the process of distribution and teering.

Fig. 11 is an elevation of a brush for cleaning the block G when required which by moving accurately on the edge of the coloring apparatus comes in contact with every part of the block on which any part of the pattern is raised the block being sufficiently lowered for this purpose when required. This brush is removed from the position seen at Fig. 7 when not in use but this cleaning of the block may also be effected by hand by raising it in the frame and using separate brushes to each portion of it which has received a distinct color.

From what has been already described of the peculiar construction and arrangement of the sieves and color box K it will be obvious to printers and persons conversant with work of this nature that this portion of my improved method of block printing is susceptible of various modifications according to the nature of the work to be done and that it is also applicable to block printing by the ordinary process without using the machinery delineated in Figs. 1, 2 and 3, Sheets 1, and 2. I shall therefore describe with reference to Figs. 13, 14, 15, 16, 17, 18, and 19, Sheet 1, one modification of this part of my invention adapted to the employment of a printing block of the ordinary size and to be used by hand either before or after dying or other process by which the texture of the fabric to be printed has been stretched contracted or otherwise varied in the same manner as block printing is ordinarily performed and when the object could not be properly or conveniently effected by a block covering the whole width of the fabric as already described.

On Sheet 1 Fig. 13, is a plan of a color box of like nature as that before described and marked K in the previous figures. Fig. 17 is a transverse section of the same taken at the line TT Fig. 13, and Fig. 18 a transverse section taken at the line *u u* Fig. 13. In these figures the same letters of reference are used as in former figures and indicate parts of a similar nature and office as in such former figures and the sieves marked NI are separated and closed by hand by means of the handle Q the position of the sieves when closed and ready to receive the block being shown at Fig. 13 and when open and ready to receive the color at Fig. 14.

The feeder or implement for distributing the color on the sieves before described as shown at Figs. 8 and 9 (is shown as adapted to the present modification at Fig. 15 and a corresponding modification of the brush or rubber for tearing or distributing the color before described as shown at Fig. 10) is shown at Fig. 16. The position in which these implements are placed when not in use will be best seen in section at Fig. 17.

It will be remarked that in the coloring apparatus before described as shown at Figs. 4 5 and 12 Sheet 2 the tearing or spreading of the color was described as performed lengthwise from end to end of the sieves. In the present modification it is performed across or at a right angle to the longest sides of the sieves as indicated by the double arrow at Fig. 14 and the sieves are divided into compartments by small bands or raised divisions placed across the sieves to prevent the intermixture of different colors placed in the same sieves. The various colors will be seen in the compartments marked *m m m m*, *m m m* in Fig. 13 each of which it will be seen is subdivided into a variety of small cells to contain colors and shades of colors and the rainbowed effect of such colors distributed on the sieves after teering is seen at Figs. 13 and 14, in the latter of which the coloring box and sieves are represented as in part broken off to save room in the drawing. These rainbowed colors transferred to the block and imprinted on the fabric will produce a pattern of the character represented at Fig. 19. Thus at one impression of the block six or more separate colors are placed on the fabric and the rainbowed effect produced and intermixed to a greater extent than has heretofore been effected.

Having described the various movements of the printing machinery represented in Figs. 1, 2 and 3, together with the peculiar construction and effect of the coloring apparatus and implements as shown at Figs. 4, 5, 6, 7, 8, 9, 10, 11, and 12 on Sheet 2 and at Figs. 13, 14, 15, 16, 17, 18 and 19 on Sheet 1, I shall now recapitulate the various movements of the printing machinery shown at Figs. 1, 2 and 3 in the order in which they take place when in operation. Supposing therefore the machinery to be in the position represented in Figs. 1 and, 2, the operative or printer would stand near the letter B, Fig. 2, facing the machine having the handle F, Fig. 2, at his right and having the teer boy at his left hand facing the dotted lines at K. The fabric to pe printed being drawn from the roller A in the direction of the red line as already described by turning the handle F and held in a state of moderate tension, the coloring apparatus K is placed in the position indicated by the dotted lines where it is held by the projections Q Q which striking against the framing of the machine separates the sieves to the extent allowed by the connecting straps *p p* and places them in a position to receive the color (see Fig. 4) which the teerboy first distributes with the feeder (Figs. 8 and 9) and then teers or spreads with his brush *y*, Fig. 10. The brush being then placed in the trough made for its reception the coloring apparatus is passed along the railway L L to the position seen at Fig. 2 immediately under the block G, where the projections Q Q are forced home by coming in contact with the framing and force up the sieves M M M M M M close to each other as seen at Fig. 5, which corresponds with the pattern supposed to be raised on the block G. At this period the printer raises the counter weight I by hand which allows the block G to descend and receive the color and again immediately drawing down the weight I the block G ascends to its former position. The teer boy then retires the coloring apparatus to the position of the dotted lines Fig. 2 and the block is again lowered by the printer to give the impression to the fabric extended over the table B. This being effected the block G is immediately raised and returned to the position seen at Figs. 1 and 2 and while the teer boy is again teering or spreading the color the printer turns the handle F and connected pinion *e*, one revolution which driving the wheel E and cylinder C carries forward an exact amount of the fabric which is calculated with reference to and corresponds with the amount printed by the last impression of the block G. By this time the teer boy has again placed the coloring apparatus K under the block and the operation proceeds in regular succession as before until the whole of the fabric is printed.

By the machinery described at Figs. 1, 2, and 3 most ordinary patterns may be produced but where it is required to print a greater number of colors than can conveniently be contained in one color box or when the pattern is of a larger size as in printing furniture patterns I sometimes use two blocks on the same table. In this arrangement it is only required to place another framing similar to that which supports the block G in Figs. 1 and 2 in the position where the dotted lines of the color box K appear at Fig. 2 and to prolong the railway L L over the cylinder C. Two teer boys would then be required one on each side of the printer who stands at B and the coloring apparatus for the present block G must then be run from under that block to the position over the roller C to the right hand teer boy while the coloring apparatus for the additional block which when imparting the colors would assume the position of the present dotted lines in Fig. 2 would be run on the railway from under the additional block to a position over the roller *a* to the left hand teer boy and thus a greater amount of block work might be executed at the same operation both blocks being lowered and raised concurrently.

It is obvious that by varying the amount of traverse of the fabric to be printed the various colors contained in the coloring apparatus may be transferred from the block to separate objects or placed in succession on one and the same object in the pattern or design. For instance if the traverse of the cloth or fabric is equal to the amount of cloth printed at any one impression of the block the six colors impressed from an apparatus such as has been described will fall on separate and distinct objects or series of objects. But supposing the traverse of the cloth or fabric to be equal to only one sixth of the whole pattern and the objects or several series of objects of which the pattern is composed to be placed within equal divisions of the block it is evident that each object or series of objects will partake of the six colors in succession and thereby comprise a combination of every color in each object or series of objects except at each end of the piece of calico or other fabric printed when a portion of the pattern equal in extent to $\frac{5}{6}$ths of the face of the block will necessarily be incomplete and therefore a loose piece of waste cloth may be fastened to each end of the fabric to be printed in order to receive the incomplete part of the pattern.

Having now described my said invention and the manner in which the same is to be performed I declare that I claim as of my invention the apparatus, or machinery, constructed as hereinbefore set forth for printing with blocks on woven fabrics of various kinds, that is to say,

1. I claim the combining of a block for printing in various colors, with the apparatus or mechanical agents for causing said block to descend in a perpendicular direction in order to take up the color from the sieve or sieves, and to impress the pattern, or design upon the fabric, said apparatus, or mechanical agents, consisting of the cross frame *g*, *g*, the arms Z Z, the straight edges at the corners of the frame, the rod H, the band and counterweight, with their appendages, the whole being so connected as that by raising the counterweight, the cross frame and block will descend, and the color be received on the block, or the impression given to the fabric.

2. And I claim the same however the said mechanical agents and contrivances may be modified or varied in size, form, proportion or other particulars not departing from the principle of my said invention. But I do not claim as of my invention such mechanical agents or contrivances separately but only as combined to effect the purpose aforesaid. Nor do I claim as part of my said invention the apparatus hereinbefore described for traversing the coloring apparatus to and fro by means of a railway and carriage running thereon the same although invented by me having been by me used and practised previous to the grant of the said Letters Patent nor do I claim as of my invention the arrangement of rollers and connected apparatus for causing the fabric to traverse or be drawn over the printing table and conveyed away when printed.

3. And I further declare that I claim as of my invention such coloring apparatus as hereinbefore described in which several sieves are separated and held apart to admit of the several colors being distributed and teered or spread thereon without admixture or interference one with another and whereby the sieves are afterward closed or brought into juxtaposition in order to the colors being taken up by the block so as to produce at one impression of the block or pattern or design or parts of a pattern or design in several colors arranged contiguous or near to each other as hereinbefore described and which coloring apparatus I claim whether the same be used in conjunction with the machinery and apparatus for giving the impression to the fabric before described or with the common hand block or otherwise and under whatsoever other modification.

ROBERT HAMPSON.

Witnesses:
WILLIAM NICHOLSON,
SAM. PEARCE.